Figure 4:
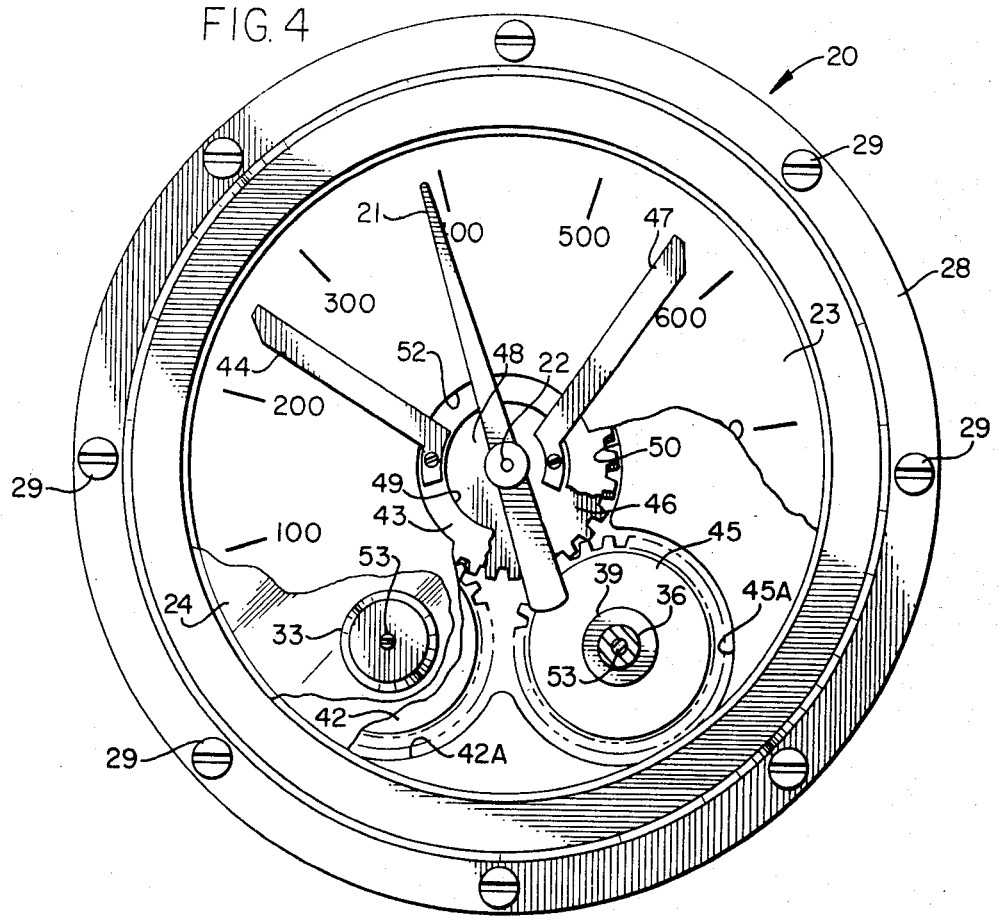

United States Patent [19]

Gray

[11] 4,270,568
[45] Jun. 2, 1981

[54] SENSOR WITH ADJUSTABLE PRESSURE RESPONSIVE DETECTION AND CONTROL

[75] Inventor: Tommy L. Gray, Dallas, Tex.
[73] Assignee: Span Instruments, Inc., Plano, Tex.
[21] Appl. No.: 13,668
[22] Filed: Feb. 21, 1979

Related U.S. Application Data

[62] Division of Ser. No. 797,914, May 18, 1977, Pat. No. 4,173,150.

[51] Int. Cl.³ .......................... F16K 31/12; G01L 7/04
[52] U.S. Cl. ...................................... 137/498; 73/714; 73/732; 137/460
[58] Field of Search ................. 137/456, 459, DIG. 2, 137/82, 85, 114, 111, 498, 460; 73/714, 732, 741, 733, 740

[56] References Cited

U.S. PATENT DOCUMENTS

| | | | |
|---|---|---|---|
| 2,062,857 | 12/1936 | Askin | 137/114 |
| 2,515,879 | 7/1950 | Korn | 200/81.8 |
| 2,586,249 | 2/1952 | Paille | 137/456 |
| 3,001,538 | 9/1961 | Bois | 137/DIG. 2 |
| 3,950,998 | 4/1976 | Murphy et al. | 73/714 |
| 4,145,025 | 3/1979 | Bergeron | 137/456 |

Primary Examiner—Donald O. Woodiel
Attorney, Agent, or Firm—Richards, Harris & Medlock

[57] ABSTRACT

A fluid pressure gauge type pressure responsive gauge drive having a drive to a sensor controller system with sensor controllers actuatingly engaged at respective adjusted pressure limits with gauge movement travel unimpeded by sensor controller contact in the range of movement between sensor controller pressure limit position settings. The drive may be connected to drive a fluid pressure gauge needle over an indicating dial and upper and lower pressure limit setting needles are adjustable to desired settings over the indicating dial. Calibration structures are provided for a coordinated setting of the gauge dial drive and in the drive of the sensor controller system calibrating each gauge structure for the "C" type bourdon tube installed. Fly open type activated block and bleed valves are used as sensor controllers mounted on cam adjusted pivotally-mounted upper pressure and lower pressure individual sensor controller mounting plates pivoted about a common pivot center that is the pivot center for the sensor controller activating arm. Further, a fluid pressure differential activated relay is shown useable in combination with the sensor controllers in a combined system.

6 Claims, 14 Drawing Figures

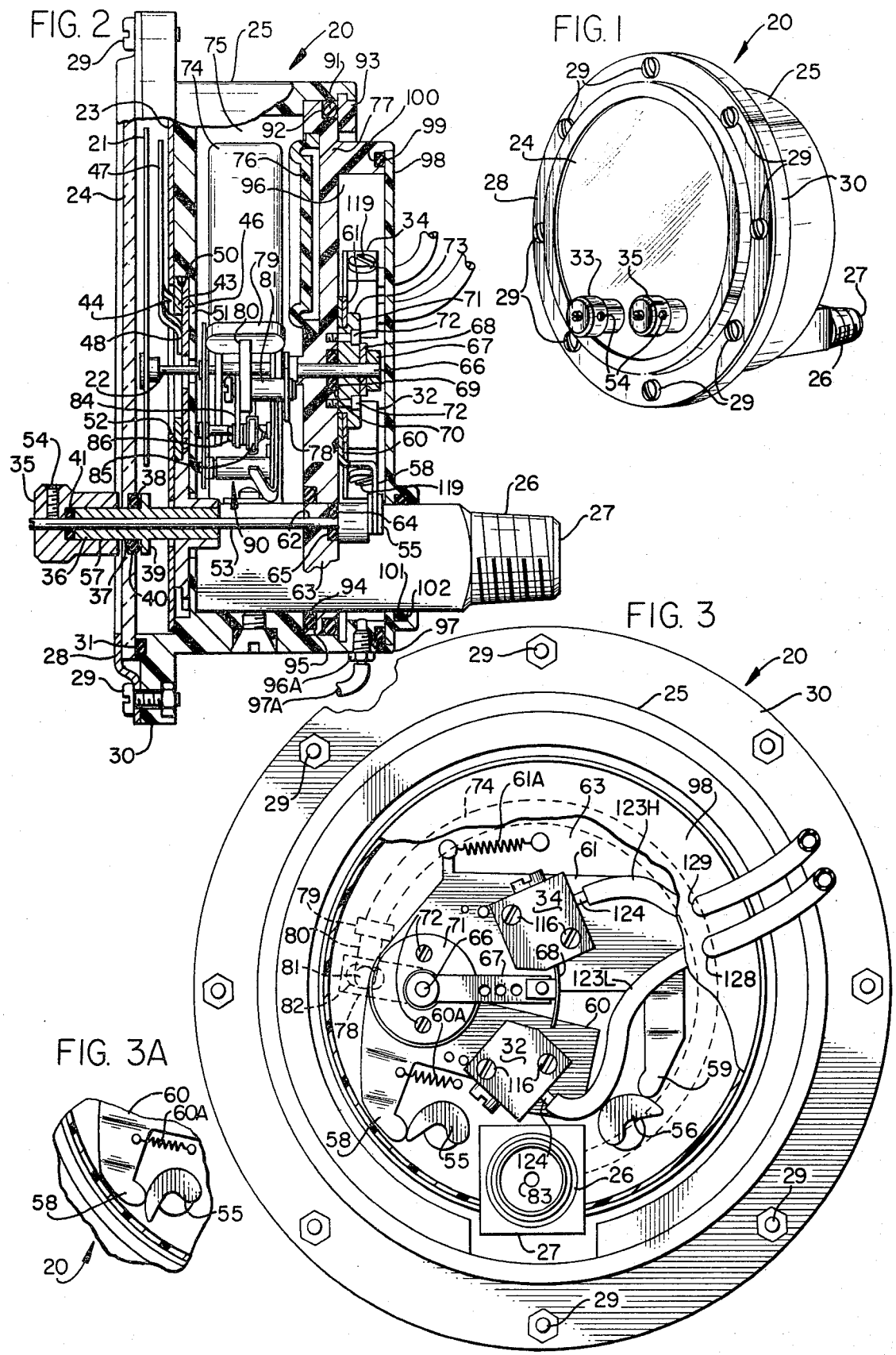

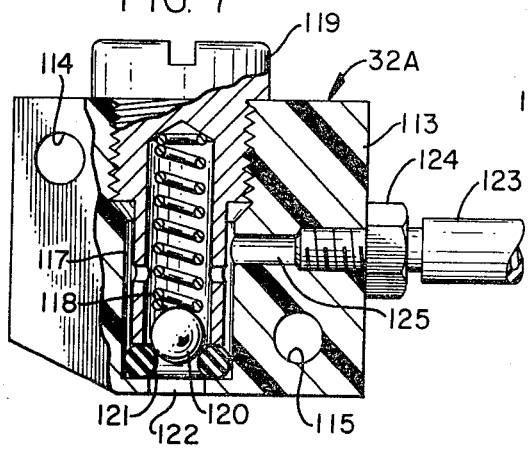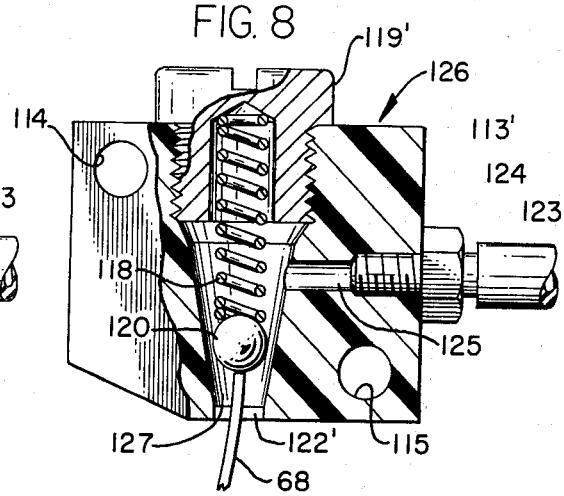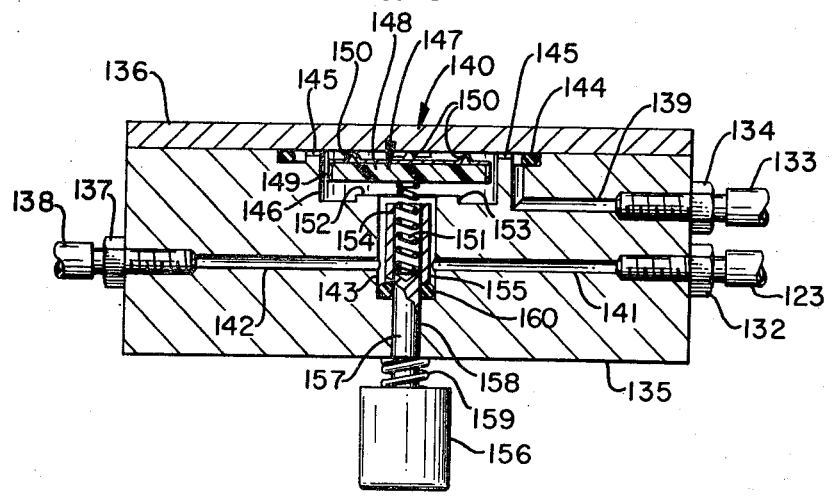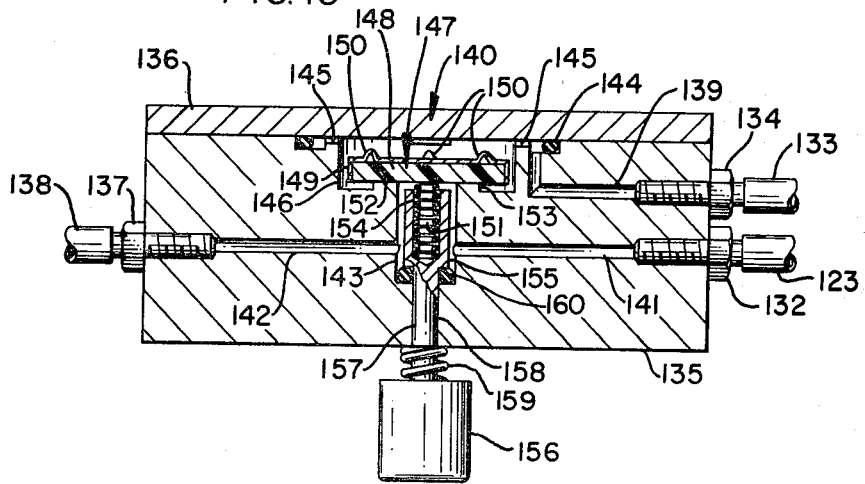

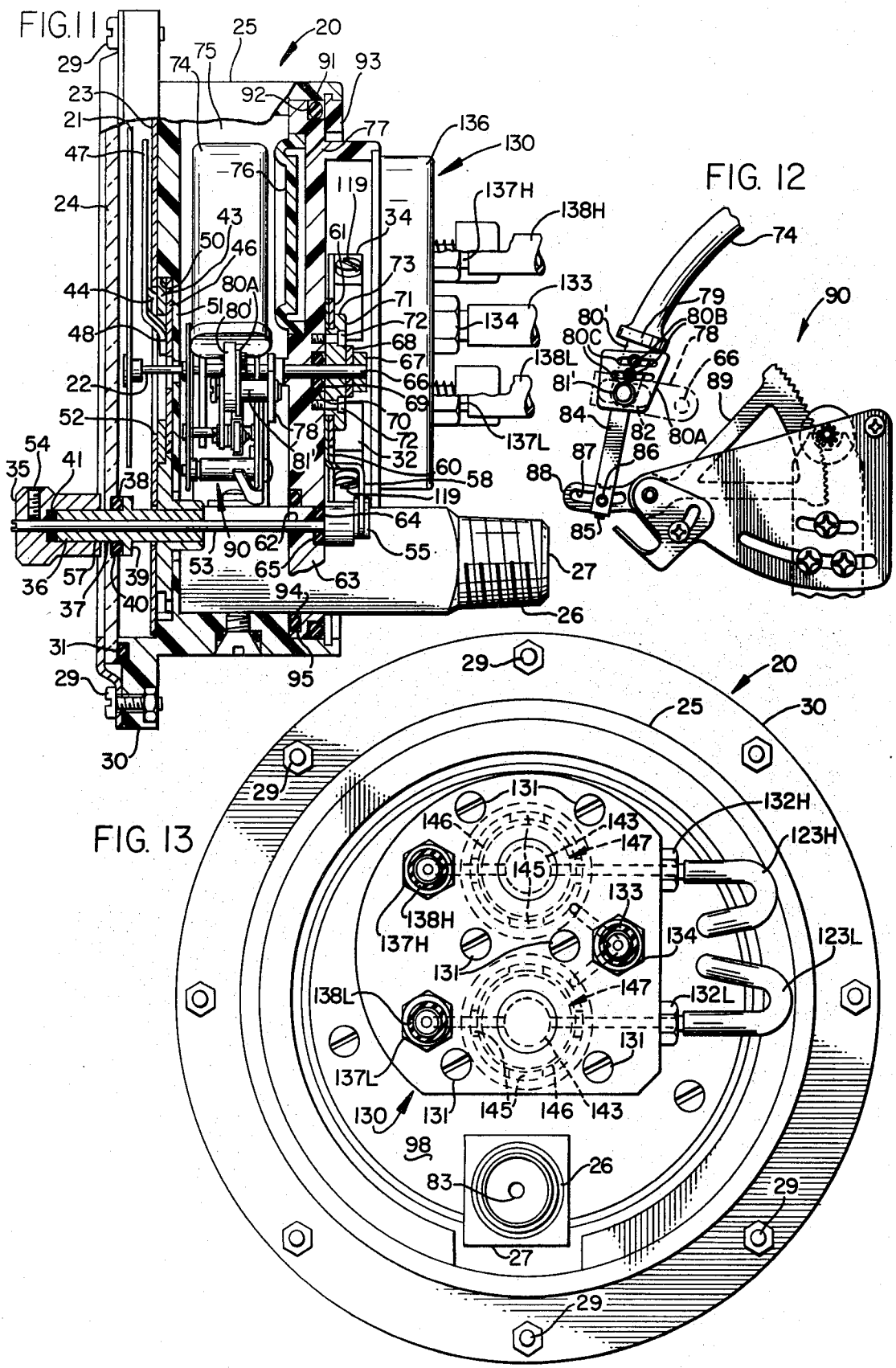

SENSOR WITH ADJUSTABLE PRESSURE RESPONSIVE DETECTION AND CONTROL

This is a division of application Ser. No. 797,914 filed May 18, 1977, now U.S. Pat. No. 4,173,150.

This invention relates in general to pressure gauges, pressure limit sensing and relays, and in particular to pressure gauges, pressure limit sensorcontrollers, pressure fluid relays and system drive calibrations that are useable in various combinations to meet specific environmental needs and design objectives.

Many pressure variation activated devices and gauge systems have been employed not only for gauge indication of pressure but also for pressure limit control such as shut down or pressure relief when pressure gets too high or when fluid pressure falls too low. Various problems are encountered with preexisting devices such as valve exhausting to an isolating media, and gauges of many existing systems are not liquid filled and it is difficult to alter them to be liquid filled. Then with respect to some systems with gauges that are liquid filled some sensing and control elements that should not be in a liquid filled environment are immersed in liquid with maintenance of liquid filled systems in many instances being at increased costs. Gauge pressure tracking accuracy has been subject to excess distortion from sensor/controller system feedback forces, and exhaust from sensor control valves is limited in many systems solely to exhaust to atmosphere. Gauge readout range with many units is reduced in order to reduce the effect of sensor controller sense activating feedback force in pneumatic systems and valves, and in some systems controller valves and actuated systems are designed with continual bleed as opposed to full shutdown. Some of the preexisting devices and systems are quite complex and still have marginal sealing that does not handle long term leaks. Further, many systems have low sensitivity and an inconsistant response time along with a restriction to a specific pressure media.

It is therefore a principal object of this invention to provide a pressure gauge type pressure responsive gauge drive having drive to a sensor controller system of clean reliable design in a relatively small package.

Another object is to provide such a pressure responsive gauge drive driving a gauge and a sensor controller system.

A further object in such a combined pressure gauge and sensor controller system is to have settable upper and lower pressure limit sensor controllers.

Another object is for such pressure limit settings to be manually settable with individual gauge indications for each.

Still another object is to provide a calibration capability in the pressure limit setting structure for such upper and lower pressure limit sensor controllers.

Another object is to also provide for factory calibration both in the gauge drive and in the drive to the sensor controllers.

A further object is to have a fly open type activation with such sensor controllers.

Another object is to have C type bourdon tube drive as part of such pressure responsive gauge drive and the benefits of containment of the bourdon tube and much of the gauge drive in a chamber that may be liquid filled while sensor controllers are in a non liquid filled chamber.

A further object is to provide a fluid pressure relay subject to activation from open to full shut off with a small differential pressure.

Still another object is to provide such a fluid pressure relay structure in a dual relay with a fluid line connection from each relay section, respectively, to the upper and lower pressure limit sensor controllers of the gauge drive driven sensor controller system.

Features of this invention useful in accomplishing the above objects include, in a gauge sensor with adjustable pressure responsive detection and control, a "C" bourdon tube gauge drive generally contained in a chamber, that in many instances would be liquid filled, driving a sensor controller actuating drive. The sensor controllers are located in another chamber that is not liquid filled and are shown to be block and bleed valves mounted on pivotally mounted plates pivoted about a pivot center common to the sensor actuating drive pivot center so that pressure limit adjustment may be accomplished with a minimum of error. Sensor controller adjustment is accomplished by rotation of cams that pivotally position the sensor mounting plates as desired. In the gauge combination upper and lower pressure limit gauge indicators are also set along with setting of the sensors themselves and calibration structure is provided for calibrating the two settings together. A calibration and pin structure is also provided in the sensor controller drive independent of calibration structure in a gauge needle drive to compensate for C type bourdon tube travel variation encountered between bourdon tubes at the time of gauge construction and factory test calibration. Block and bleed valves are shown as the sensor actuators (although electric micro switches could be used or other sensor activating drive responsive devices as may be desired). A fluid pressure relay is shown that is useable with the gauge sensor controllers since it is quick acting from open to full shut-off by a relatively small differential pressure in the relay system.

Figure 5:
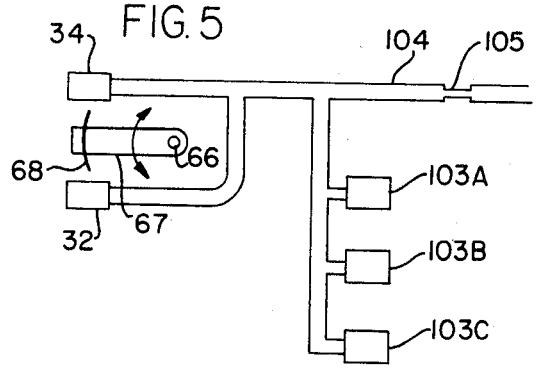
Figure 6:
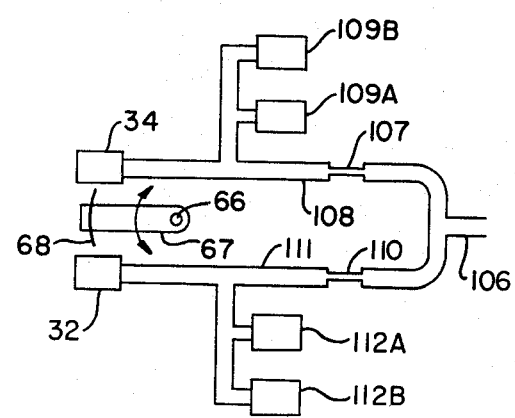

Specific embodiments representing what are presently regarded as the best mode for carrying out the invention are illustrated in the accompanying drawings:

In the drawings:

FIG. 1 represents a perspective view of a pressure gauge equipped with adjustable upper and lower pressure sensors;

FIG. 2, a side elevation of the pressure gauge of FIG. 1 partially broken away and sectioned;

FIG. 3, a back elevation view of the pressure gauge of FIGS. 1 and 2 partially broken away showing interior detail with adjustable upper and lower pressure limit sensors mounted on adjustment plates;

FIG. 3A, a fragmentary internal view of shifted cam adjustment from FIG. 3 for a pressure gauge and the gauge adjustment thereof;

FIG. 4, a front elevation view of the pressure gauge of FIGS. 1, 2 and 3 partially broken away showing external and interior detail of knob driven setting details of the adjustable upper and lower pressure sensors and their gauge indicators;

FIG. 5, a schematic view of a pressure supply system for control pressure operated devices including a supply flow restriction orifice and a pressure sensor control;

FIG. 6, a schematic view of a pressure supply system much like that of FIG. 5 with, however, a supply flow restriction in the supply to upper pressure sensor and control and a supply flow restriction in the supply to lower pressure sensor and control and the respective fluid pressure controlled devices connected to each;

FIG. 7, a block and bleed valve such as used as the upper and lower pressure sensors and control dump valves in the pressure gauge embodiment of FIGS. 1, 2 and 3;

FIG. 8, a block and proportional bleed valve that may be used in place of the block and bleed valve of FIG. 7 in some gauge and/or control embodiments as desired;

FIG. 9, a fluid pressure relay representation, that may be added to a sensor control device such as shown with the embodiment of FIGS. 11 and 13, with the relay in normal mode with block and bleed blocked;

FIG. 10, the relay of FIG. 9 represented as being in the full shut-off state with the block and bleed sensor controller having opened and not reset or presently open;

FIG. 11, a side elevation of a pressure gauge like that of FIG. 2 equipped with adjustable upper and lower pressure sensor-controllers and a fluid pressure relay mounted on the back;

FIG. 12, a partial detail view of an adjustable bourdon tube end plate for sensor calibration adjustment with different bourdon tubes and calibration adjustment linkage to sector gear drive; and, FIG. 13, a rear elevation view of the pressure gauge of FIG. 11 with a fluid pressure relay mounted thereon.

Referring to the drawings:

The fluid pressure gauge 20 of FIGS. 1, 2, 3 and 4 is shown to have a gauge needle 21 pivotally mounted with a pivot center 22 so as to be the gauge indicator over dial face 23. The window 24 over dial face 23 is a part of gauge case 25 from which threaded 26 stem mount 27 extends. Window 24, is mounted in place by a mounting rim 28 bolted 29 to bolt flange 30 of case 25 with an annular seal 31 thereunder. A lower pressure limit sensor 32 setting adjustment knob 33 and an upper pressure limit sensor 34 setting adjustment knob 35 are mounted to extend outwardly to the front from the face of gauge window 24 with knobs 33 and 35 each mounted on a pivot shaft 36 extended through an opening 37 in window 24. An O-ring seal 38 between shoulder 39 of each pivot shaft 36 and the bottom of a seal recess 40 in window 24 around each opening 37 along with the annular seal 31 and an O-ring seal 41 within each knob 33 and 35, seal the front of the gauge from loss of fluid whenever the gauge is in the fluid filled state. Each pivot shaft 36 mounts a gear, shaft 36 with knob 33 mounts gear 42 that meshes with a pivotally supported gear 43 that mounts low pressure limit gauge needle 44, and shaft 36 with knob 35 mounts gear 45 that meshes with a pivotally supported gear 46 that mounts high pressure limit gauge needle 47. Gauge needle 47 is mounted on the forward face 48 of gear 46 and extends through enlarged clearance opening 49 in gear 43 to extend out over dial face 23. Both gears 43 and 46 are supportingly confined in case opening 50 between case shoulder 51 and the back of dial face 23 for free relative rotative movement as driven by the respective gears 42 and 45. The center opening 52 of dial face 23 is a clearance opening to permit both the low and high pressure limit needles 44 and 47 to extend out over dial face 23. Please note that needles 44 and 47 underlie the plane of gauge needle 21 rotation in order to never present an obstruction to the movement thereof. Please note that gears 42 and 45, while not being supported as are gears 43 and 46, they are longitudinally restrained in case openings 42A and 45A between case shoulder 51 and the back of dial face 23.

The knobs 33 and 35 are each non rotatably fixed on its individual combination calibration and setting shaft 53 with a screw slot at the end, by a set screw 54 tightened during a factory calibration setting to insure that the lower sensor 32 and upper sensor 34 setting cams 55 and 56 are in a calibration coordinated setting with the respective gears and low and high pressure gauge needles 44 and 47. Each combination calibration and setting shaft 53 is a free turning fit within its pivot shaft 36 upon which the hub opening 57 of the respective knob 33 or 35 is a press fit. The cam riding projections 58 and 59 respectively of the pivotally mounted lower sensor 32 mounting plate 60 and the pivotally mounted upper sensor 34 mounting plate 61 are resiliently urged by tension springs 60A and 61A connected between case wall 63 and plates 60 and 61 to ride along the substantially linear cam surface of the cams 55 and 56 that are linear through approximately 330 degrees of cam turning. This provides for a cam to gear differential with indicating needle drive of approximately 270° for the upper and lower limit gauge needles 44 and 47 being available for factory calibration setting to coordinate sensor activation with upper and lower needle settings. Please note that the combination calibration and setting shafts 53 extend through openings 62 in case wall 63 and are provided with O-ring seals 64 in recesses 65 beneath the cams 55 and 56 in order that the gauge as such may be a liquid fluid filled gauge while the sensor section at the gauge back is not liquid filled. The lower and upper sensor mounting plates 60 and 61 are pivotally mounted to rotate in this sensor adjustment movement about a common center that is also common to the pivotal center of the pivot shaft 66 mounting sensor actuator arm 67. Arm 67 mounts at the sensor actuating end a curved trip wire 68 that is the sensor engaging member having a curvature of a circle arc of its radius from the center of pivot shaft 66 so that the respective sensor activating ends of the curved trip wire 68 properly enter and actuate the respective sensor 32 or 34 when a set pressure limit is reached regardless of the pressure pivotally adjusted limit thereof. The pivot shaft 66 is pivotally journaled in case wall 63 with an O-ring seal 69 in case wall groove 70 beneath the pivotal retainer mount member 71, mounted to case wall 63 by screws 72, that pivotally mount and longitudinally restrains the plates 60 and 61 between the shoulder 73 of member 71 and the back of case wall 63. The pivotal shaft 66 extends into the bourdon tube 74 enclosing chamber 75, that may be liquid filled and provided with a liquid expansion and contraction relief diaphragm 76, having a back vent opening 77 to atmosphere, where it is fixed to take-up arm 78 that is rotationally moved about the rotational center of pivot shaft 66 with actuation fluid pressure change induced bourdon tube end 79 travel. The end 79 of bourdon tube 74 has a tab extension 80 mounting a sensor drive actuating pin 81 that drivingly engages slot edges of take-up slot 82 in take-up arm 78. The bourdon tube 74 that is shown is a standard "C" type bourdon tube connected for internal pressure fluid communication with the pressure feed opening 83 in stem mount 27. The bourdon tube 74 end tab 80 is also provided, as shown in FIG. 12, with a pin link 84 interconnect connection with a calibration set lock member 85 connection pin 86 projecting into the slot 87 of pivot arm extension 88 of the gear sector member 89 of a standard gauge needle drive assembly 90 that drives gauge needle 21.

Referring again to FIG. 12, a calibration plate 80A is adjustably mounted on end tab 80' by position lock screws 80B extended through plate slot 80C. This provides for transverse calibration positioning of plate 80A and the sensor drive actuating pin 81', replacing the pin 81 of the FIGS. 1-4 embodiment, that drivingly engages slot edges of take-up slot 82 in take-up arm 78. This calibration feature is an important option providing a calibration option for bourdon tube travel variation through the designed range of pressure variation that may be, for example, typically 80 to 90 thousands of an inch travel for a specific pressure range. This varies the actuating pin 81' to pivot shaft 66 radius to calibration compensate for bourdon tube actuating end travel variation-a calibration adjustment generally accomplished at the factory during sensor drive and gauge construction.

An O-ring seal 91 held in groove 92 of case wall 63 by retainer ring 93 along with O-ring type seal 94 in seal groove 95 around stem mount 27 aids in sealing the gauge chamber 75 so that it may be a liquid fluid filled gauge. While the gauge chamber 75 may be liquid fluid filled, the case chamber 96 enclosed by housing extension 97, case wall 63, and back cover 98, cooperating with a seal 99 in housing seal groove 100 and having a seal 101 in groove 102 around the stem mount 27, is not liquid filled. Thus, with lower and upper limit sensors 32 and 34, the sensor actuator arm 67 with sensor trip wire 68, the pivotally mounted plates 60 and 61, and the setting cams 55 and 56 being in the non liquid environment of chamber 96, the combination calibration and setting shafts 53 extend through the liquid environment of chamber 75 from the knobs 33 and 35 to chamber 96, and the pivot shaft translates bourdon tube end induced rotative motion through from chamber 75 to chamber 96 for limit actuation of the sensors. The drain fitting 96A and line 97A provide for liquid return to a sump of any liquid bleed from valves 32 and 34 in a closed system or if the fluid is a pressure gas controlled system venting.

The schematic showing of a pressure supply system of FIG. 5 illustrates how the lower and upper pressure sensors 32 and 34 could be used to control pressure operated devices 103A, 103B, and 103C as fed through a pressure fluid line system 104 including a supply flow restriction orifice 105. In this system, having a single inlet and outlet, shut off is provided on a high or a low pressure limit trip. With, for example, a 30 p.s.i. control pressure the restrictive orifice could be gauged to allow 3 p.s.i. build up with one of the sensors 32 and 34 in the form of a block and bleed valve is bleed open. The control pressure operated devices could be 30 p.i.s.-on and 15 at blow-off and line system 104 pressure would fall off from 30 p.s.i. to 3 p.s.i. (with orifice 105).

In the pressure supply system shown in schematic form in FIG. 6, the pressure supply line 106 is split to feed through a supply flow restriction orifice 107 to a high pressure limit supply line 108 connected to control pressure operated devices 109A and 109B and to upper pressure sensor 34, and through a supply flow restriction orifice 110 to a low pressure limit supply line 111 connected to control pressure operated devices 112A and 112B, and to lower pressure sensor 32. Thus, the control pressure operated devices of the respective two branches are subject to pressure drop when the respective upper or lower pressure limit sensor 34 or 32 is tripped such as in the form of a block and bleed valve being tripped to bleed open. The restrictive orifices 107 and 110 could be gauged to allow 3 p.s.i. buildup when the sensor in the form of a block and bleed valve, of the branch is tripped to bleed open.

A typical block and bleed valve 32A that may be used as the lower and upper pressure sensors 32 and 34 with the gauge of FIGS. 1-4, shown in FIG. 7. The block and bleed valve 32A is shown to have a body 113 with openings 114 and 115 for mounting screws 116 and a center block valve opening 117. A spring 118 confinement cap 119 is threaded into the valve opening 117 with the spring 118 resiliently urging valve ball 120 toward seating engagement on O-ring seal 121 to block fluid pressure flow to and through valve opening 122. Pressure line 123 is connected through fitting 124 and opening 125 for fluid pressure communication with valve opening 117 such that when valve ball 120 is displaced inwardly away from sealing contact with O-ring seal 121 by the end of such as trip wire 68, the valve is transformed from the blocked to the bleed state to thereby lower pressure in fluid pressure line 123. Displacement of the valve ball 120 inwardly by trip wire 68 is advantageously a quick fly open type actuating action since less actuating ball displacement force is required after intial lifting of the ball away from sealing contact with O-ring seal 121.

The block and proportional bleed valve 126, shown in FIG. 8, may be used in place of one or the other or both block and bleed valves 32 and 34 as may be desired for some operational environments. Items the same with valve 126 as with valve 32A are given the same number, a primed number if much the same, and a new number if different as a matter of convenience. With valve 126, the block ball 120 is contained in a conical opening 127 and block seats toward the apex end of opening 127 until unblocked by the end of a trip wire 68 in a valve having an adjustable dead band and proportional bleed at the trip point and with lead 120 and adjustable dead band and proportional bleed at the trip point and with lead 120 and trip point movement. Confinement cap 119' in this valve is shorter than cap 119 in valve 32A in being threaded into the valve 126 only to the top of conical opening 127. Please note that fluid pressure lines 123L and 123H extend, respectively, from fittings 124 of sensor valves 32 and 34 through openings 128 and 129 in back cover 98 as shown in FIG. 3.

Please note that electronic switches such as microswitches could be used in place of pressure limit sensors 32 and 34 with the gauge device of FIGS. 1-4 for some applications as may be desired. Other existing contact or non-contact detectors could be used in place of pressure limit sensors 32 and 34.

The fluid pressure gauge 20' of FIGS. 11 and 13 is generally the same as gauge 20 of FIGS. 1-4 with, however, a fluid pressure relay 130 added to the back and items the same are given the same number as a matter of convenience with much of the explanation the same not repeated again. The fluid pressure relay 130 that is mounted on the back of back cover 98 by screws 131 is connected to lines 123L and 123H by fittings 132L and 132H and a control pressure line 133 is connected to relay fitting 134. Since the relay 130 is a dual fluid pressure relay in a single body 135 with an enclosure plate 136 dual items will carry common identification numbers distinguished by L for low pressure limit and H for high pressure limit with representation showings of FIGS. 9 and 10 carrying the base identification numbers without the further L or H designation. The relay 130 has outlet fittings 137L and 137H connected respectively through lines 138L and 138H to control pressure operated devices (not shown) but like devices 109A and 109B and 112A and 112B of the schematic showing of FIG. 6. The control pressure line fitting 134 is connected through fluid feed pressure line passages 139L and 139H to the respective relays 140L and 140H in the dual relay 130, fittings 132L and 132H connected through passages 141L and 141H, and fittings 137L and 137H connect through passages 142L and 142H, respectively, to chambers 143L and 143H of the relays 140L and 140H. The remainder of the items to be identified will not carry L and H since they are substantially identical between the relay sections 140L and 140H of the dual relay 130 and the following description will generally be in singular form since operation of both is identical. The pressure fluid passage 139 feeds O-ring 144 groove 145 that radially within O-ring 144 is a radial pressure fluid distribution passage from which four shallow passages 145 connect as pressure fluid feed passages to relay actuation chamber 146. This insures a more uniform input of fluid flow directed primarily to above (as seen in FIGS. 9 and 10) The relay actuating disc assembly 147 whenever there is a lessening pressure in chamber 143 relative to fluid pressure in fluid feed pressure line passage 139. Disc assembly 147 is a generally cylindrical disc 148 of resilient sealing material encased circumferentially and on the top side by a relatively rigid material can 149 having a plurality of spacing knobs 150 on the top. the knobs 150 (or projections) insure space generally between the disc assembly 147 and plate 136 so that an actuating differential in pressure between fluid feed pressure line passage 139 can quickly act in lowering the disc assembly 147 in a quick actuating action from the normal operation blocked made of operation of FIG. 9 to the full shut off state of FIG. 10 that would come about whenever a block and bleed valve 32 or 34 has opened or is open in the combined system embodiment of FIGS. 11 and 13.

Differential pressure actuation movement of the disc assembly 147 from the state of FIG. 9 to the full shut off state of FIG. 10 is against the resilient compressive force of coil spring 151 to the position with the resilient sealing material disc 148 being in seated engagement on the annular top surface 152 of internal projection 153 within chamber 146. Coil spring 151 is generally supported and guided within the opening 154 of the reset extension 155 from reset knob 156. Reset extension 155 has a reduced diameter shank 157 that extends through opening 158 in body 135 to knob 156 with an external compression coil spring 159 included around shank 157 compressible between body 135 and knob 156. An O-ring seal 160 is provided within the chamber 143 to seal the opening 158 around shank 157 from loss of fluid pressure. Spring 151 is selected or set so as to provide fast acting relay actuation at a desired pressure differential, for example, a 0.5 pount per square inch differential. The relay 140 is reset by pressing the relay knob 156 inward when the sensor attached to line 138 is closed and control devices connected to line 123 are closed so that pressure in chamber 143 builds up to essential equilibrium with fluid pressure in fluid pressure line 139 and holding the knob 156 in until pressure equilibrium is attained. It should be realized that the fluid pressure dual relay 130 may be used as a fluid pressure differential shut off in environments other than are in combination with a gauge and/or control sensor structure such as taught with the embodiment of FIGS. 11 and 13 as based on the embodiment of FIGS. 1-4.

It should be realized that various subsections of bourdon tube driven pressure limit sensor controller, interlinking drive stuctures, calibration provisions for both gauge and pressure limit sensor controller setting structures may be used in various combinations for different applications as desired. Further, the new relay structure may be advantageously used in meeting various environment application requirements as activated by block and bleed sensor controllers used in a pressure change driven pressure gauge and sensor drive system.

Whereas this invention is herein illustrated and described with respect to several embodiments thereof, it should be realized that various changes may be made without departing from the essential contributions to the art made by the teachings hereof.

I claim:

1. A fluid pressure relay comprising:
   a relay body;
   first chamber means in said body;
   second chamber means in said body having an opening into said first chamber means;
   a first passage in said body for external connection in communication with said first chamber means;
   at least one additional passage in said body for external connection and in communication with said second chamber means;
   relay valve means in said chamber means responsive to a differential pressure between said first and second chamber means resulting from a fluid flow from said additional passages greater than through the opening to move said relay valve means between an open state to a closed state where the open state allows communication between said first and second chambers and in the closed state closes the opening between said chamber to allow communication between said additional passages and block communication with said first passage, said valve means being actuated from said open state to said closed state by predetermined pressure differential between said first and second chamber means; and
   manual reset means for actuating said valve means from the closed state to the open state by reducing the pressure differential below the predetermined level.

2. The relay according to claim 1 including:
   a valve seat at the interface of said first and second chambers, which seat is engaged by said valve means in said closed position to seal said first chamber from said second chamber and block communication therebetween.

3. The relay according to claim 2 wherein said valve means comprises a sealing disc in said first chamber resiliently biased away from said valve seat to said open position and movable toward and into sealing engagement with said valve seat in response to said predetermined pressure differential.

4. The relay according to claim 3 wherein:
   said first chamber has a larger diameter than said second chamber;
   said second chamber opens upwardly into said first chamber through a central raised annular shoulder on the bottom wall of said first chamber; and
   said sealing disc has a larger diameter than said second chamber and comprises a resilient sealing material held in a rigid material can having a plurality of projections on the top thereof, the underside resilient sealing material of said disc engaging said raised shoulder in said closed position of said valve means, said top rigid projections engaging the top of said first chamber in said open position of said valve means to provide a spacing gap above said disc for quick response to said pressure differential.

5. The relay according to claim 4 wherein said first passage includes input means including an annular groove concentric to the upper part of said first chamber with inward directional means for directing fluid pressure to said gap above said disc in its uppermost position.

6. The relay according to claim 4 wherein said manual reset means includes a button having a shank extending upwardly through said body into said second chamber and having an enlarged diameter upper extension with a central opening therein supporting and guiding a compression spring extending upwardly to engage the underside of said disc and resiliently bias the latter toward said open position, depression of said reset button lifting said disc off said raised shoulder.

* * * * *